(12) United States Patent
McCulloch et al.

(10) Patent No.: US 10,967,352 B1
(45) Date of Patent: Apr. 6, 2021

(54) MICROFLUIDIC LIQUID-LIQUID CONTACTOR

(71) Applicant: Triad National Security, LLC, Los Alamos, NM (US)

(72) Inventors: Quinn McCulloch, Los Alamos, NM (US); Stephen Yarbro, Los Alamos, NM (US); Rebecca Chamberlin, Los Alamos, NM (US); Quintessa Guengerich, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 127 days.

(21) Appl. No.: 15/947,673

(22) Filed: Apr. 6, 2018

Related U.S. Application Data

(60) Provisional application No. 62/483,107, filed on Apr. 7, 2017.

(51) Int. Cl.
| | | |
|---|---|---|
| *B01J 14/00* | (2006.01) | |
| *B01L 3/00* | (2006.01) | |
| *B01J 8/00* | (2006.01) | |
| *B01J 19/00* | (2006.01) | |

(52) U.S. Cl.
CPC .......... *B01J 14/00* (2013.01); *B01J 19/0093* (2013.01); *B01J 2219/00783* (2013.01); *B01J 2219/00804* (2013.01); *B01J 2219/00837* (2013.01); *B01J 2219/00844* (2013.01); *B01J 2219/1923* (2013.01)

(58) Field of Classification Search
CPC .................... B01J 14/00; B01J 19/0093; B01J 2219/00783; B01J 2219/00804; B01J 2219/00837; B01J 2219/1923; B01J 3/00; B01J 8/00; B01L 3/00
See application file for complete search history.

(56) References Cited

U.S. PATENT DOCUMENTS

| | | | |
|---|---|---|---|
| 3,585,005 | A | 6/1971 | Coggan |
| 5,904,849 | A | 5/1999 | Kim et al. |
| (Continued) | | | |

OTHER PUBLICATIONS

Lazare, "The Puraq Seawater Desalination Process," *Desalination*, vol. 42, pp. 11-16 (1982).
(Continued)

*Primary Examiner* — Brian J. Sines
(74) *Attorney, Agent, or Firm* — Klarquist Sparkman, LLP

(57) ABSTRACT

An assembly comprises a first liquid guide having an inlet, an outlet, and a liquid-conducting layer comprising a first material. The liquid-conducting layer extends between the inlet and the outlet. A second liquid guide has an inlet, an outlet, and a liquid-conducting layer comprising a second material. The liquid-conducting layer extends between the inlet and the outlet. At least a portion of the liquid-conducting layer of the second liquid guide overlaps the liquid-conducting layer of the first liquid guide such that, when a first liquid flows along the liquid-conducting layer of the first liquid guide and a second liquid flows along the liquid-conducting layer of the second liquid guide, the second liquid contacts the first liquid along the portion of the liquid-conducting layer of the second liquid guide that overlaps the liquid-conducting layer of the first liquid guide.

18 Claims, 11 Drawing Sheets

(56) References Cited

U.S. PATENT DOCUMENTS

| | | | |
|---|---|---|---|
| 6,725,882 B1* | 4/2004 | Shia | F15C 5/00 |
| | | | 137/807 |
| 7,207,445 B2 | 4/2007 | Manna et al. | |
| 9,804,607 B1* | 10/2017 | Coleman | B23P 11/00 |
| 10,401,876 B1* | 9/2019 | Coleman | G05D 7/00 |
| 2004/0052703 A1 | 3/2004 | Smith, Jr. | |
| 2006/0157411 A1 | 7/2006 | Massingill | |
| 2013/0090488 A1* | 4/2013 | Dietz | B01D 61/243 |
| | | | 554/185 |
| 2014/0231256 A1* | 8/2014 | Packingham | G01N 1/405 |
| | | | 204/572 |
| 2015/0136606 A1* | 5/2015 | Tuteja | B01D 61/425 |
| | | | 204/518 |
| 2016/0251803 A1* | 9/2016 | Tuteja | C09D 5/00 |
| | | | 428/311.71 |

OTHER PUBLICATIONS

Lazare, "The Puraq Seawater Seawater Desalination Process—An Update," *Desalination*, vol. 85, pp. 345-360 (1992).

"Liquid-Liquid Coalescer Design Manual," *ACS Industries, LP*, 2006, 20 pp.

Kenig et al., "Micro-separation of fluid systems: A state-of-the-art review," *Separation and Purification Technology*, vol. 120, pp. 245-264 (2013).

\* cited by examiner

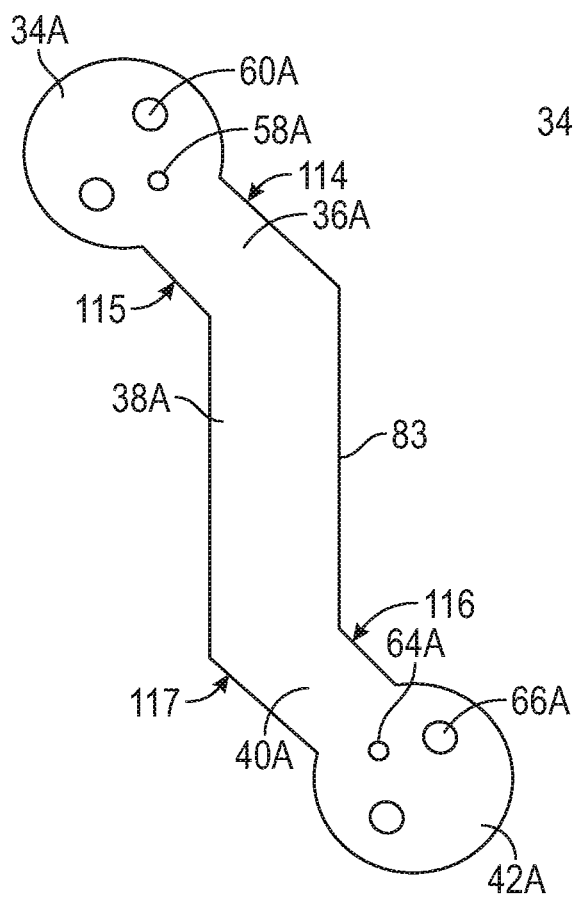
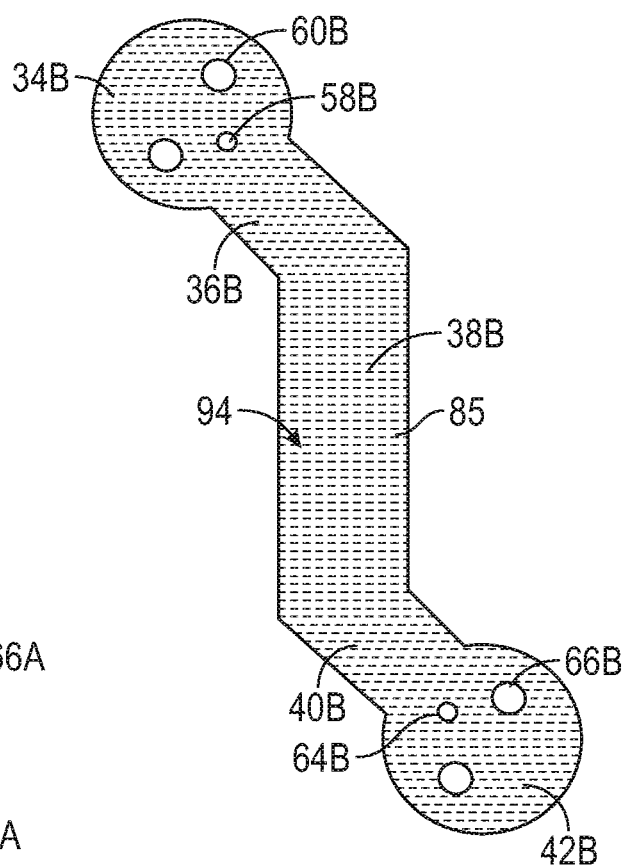
FIG. 5
FIG. 6
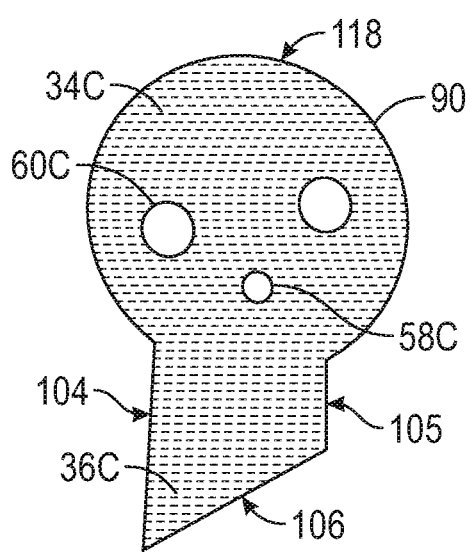
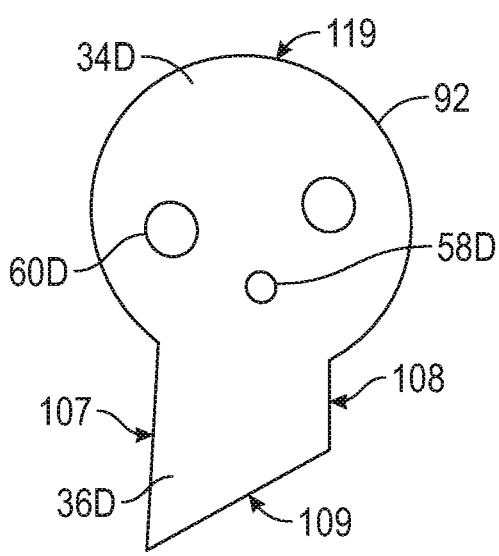
FIG. 7
FIG. 8

MICROFLUIDIC LIQUID-LIQUID CONTACTOR

CROSS REFERENCE TO RELATED APPLICATION

This application claims the benefit of U.S. Provisional Patent Application No. 62/483,107, filed Apr. 7, 2017, which is incorporated herein by reference in its entirety.

ACKNOWLEDGMENT OF GOVERNMENT SUPPORT

This invention was made with government support under Contract No. DE-AC52-06NA25396 awarded by The U.S. Department of Energy. The government has certain rights in the invention.

BACKGROUND

Existing micro-scale liquid-liquid contactors and separators are typically based on a single fluidic channel design, making high throughput microfluidic contactors impractical. Other microfluidic devices that use membranes to separate fluid phases can circumvent this scalability issue, where a membrane is sandwiched between two sets of microfluidic channels and the fluids flow on either side of the membrane. In this case, multiple parallel channels can be implemented. However, use of a membrane can decrease mass transfer between the two liquid phases because the membrane acts as a barrier. Also, without the use of a membrane barrier, it is difficult to achieve dual flow, where the two fluid phases are flowing in opposite directions in the microfluidic chip. Additionally, microfluidic devices of these sorts are difficult to manufacture, requiring processes like photolithography and laser machining, and often must be assembled in a clean room. Accordingly, a need exists for improved microfluidic devices.

SUMMARY

Embodiments of the technology described herein relate to microfluidic devices including liquid guides for bringing different liquids into contact with each other. In one representative embodiment, an assembly comprises a first liquid guide having an inlet, an outlet, and a liquid-conducting layer comprising a first material. The liquid-conducting layer extends between the inlet and the outlet. The assembly further comprises a second liquid guide having an inlet, an outlet, and a liquid-conducting layer comprising a second material that is different from the first material. The liquid-conducting layer extends between the inlet and the outlet. At least a portion of the liquid-conducting layer of the second liquid guide overlaps the liquid-conducting layer of the first liquid guide such that, when a first liquid flows along the liquid-conducting layer of the first liquid guide and a second liquid flows along the liquid-conducting layer of the second liquid guide, second liquid contacts first liquid along the portion of the liquid-conducting layer of the second liquid guide that overlaps the liquid-conducting layer of the first liquid guide.

In another representative embodiment, a method comprises situating a first liquid guide on a surface of a first housing portion, the first liquid guide having an inlet, an outlet, and a liquid-conducting layer comprising a first material. The liquid-conducting layer extends between the inlet and the outlet. The method further comprises situating a second liquid guide on the surface of the first housing portion such that at least a portion of a liquid-conducting layer of the second liquid guide overlaps the liquid-conducting layer of the first liquid guide, and such that when a first liquid flows along the liquid-conducting layer of the first liquid guide and a second liquid flows along the liquid-conducting layer of the second liquid guide, second liquid contacts first liquid along the portion of the liquid-conducting layer of the second liquid guide that overlaps the liquid-conducting layer of the first liquid guide. The liquid-conducting layer of the second liquid guide comprises a second material that is different from the first material, and the liquid-conducting layer of the second liquid guide extends between an inlet and an outlet of the second liquid guide. The method further comprises securing a second housing portion to the first housing portion to enclose the first and second liquid guides.

In another representative embodiment, a method comprises flowing a first liquid through a first liquid guide having an inlet, an outlet, and a liquid-conducting layer comprising a first material. The liquid-conducting layer extending between the inlet and the outlet. The method further comprises flowing a second liquid through a second liquid guide having an inlet, an outlet, and a liquid-conducting layer comprising a second material that is different from the first material. The liquid-conducting layer extends between the inlet and the outlet. At least a portion of the liquid-conducting layer of the second liquid guide overlaps the liquid-conducting layer of the first liquid guide such that second liquid contacts first liquid along the portion of the liquid-conducting layer of the second liquid guide that overlaps the liquid-conducting layer of the first liquid guide.

BRIEF DESCRIPTION OF THE DRAWINGS

FIG. 5 is a bottom plan view of one embodiment of a solid member of the liquid guide of FIGS. 4A-4C that is configured to extend along the length of the liquid guide.

FIG. 6 is a bottom plan view of one embodiment of a porous member of the liquid guide of FIGS. 4A-4C that is configured to extend along the length of the liquid guide.

FIG. 7 is a top plan view of another embodiment of a porous member of the liquid guide of FIGS. 4A-4C that is configured to be located at an inlet portion or an outlet portion of the liquid guide.

FIG. 8 is a top plan view of another embodiment of a solid member of the liquid guide of FIGS. 4A-4C that is configured to be located at an inlet portion or an outlet portion of the liquid guide.

DETAILED DESCRIPTION

Certain embodiments of the disclosure relate to devices and methods of bringing different liquids into contact with each other to allow interactions between the liquids at an interfacial boundary between the liquids. For example, in certain embodiments the devices described herein include a plurality of liquid guides configured to allow different liquid streams to flow along respective of the liquid guides. In certain examples, the different liquids may be immiscible liquids. For example, one liquid may be an aqueous liquid and one liquid may be a non-aqueous or organic liquid. In certain embodiments, the liquid guides can be configured to allow liquids to flow along the liquid guides and interface with or contact each other, allowing the exchange of heat, solutes, entrained particles, etc., between the liquid streams without significant mixing of the liquids, and without a barrier between the liquids, such as a membrane. In certain embodiments, the devices can be configured to operate in microfluidic flow regimes, and can be scalable to achieve increased throughput.

Figure 1:
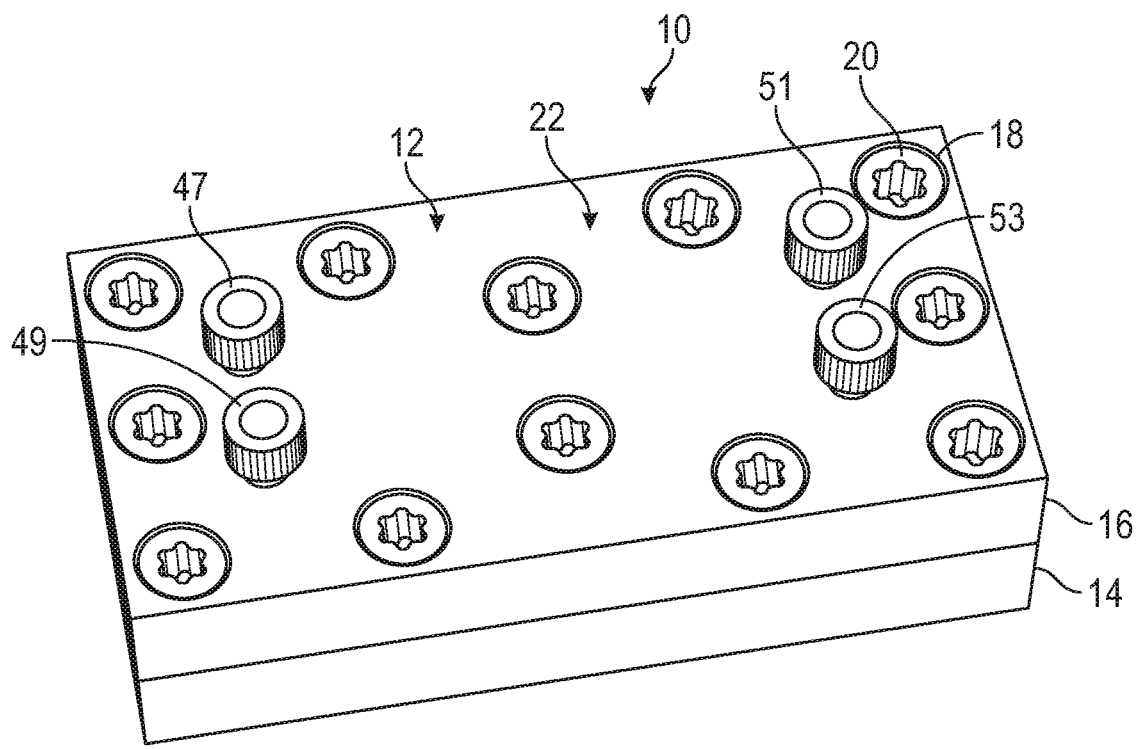
FIG. 1 is a perspective view showing the top of a microfluidic device contained in a housing, according to one embodiment.
Figure 2:
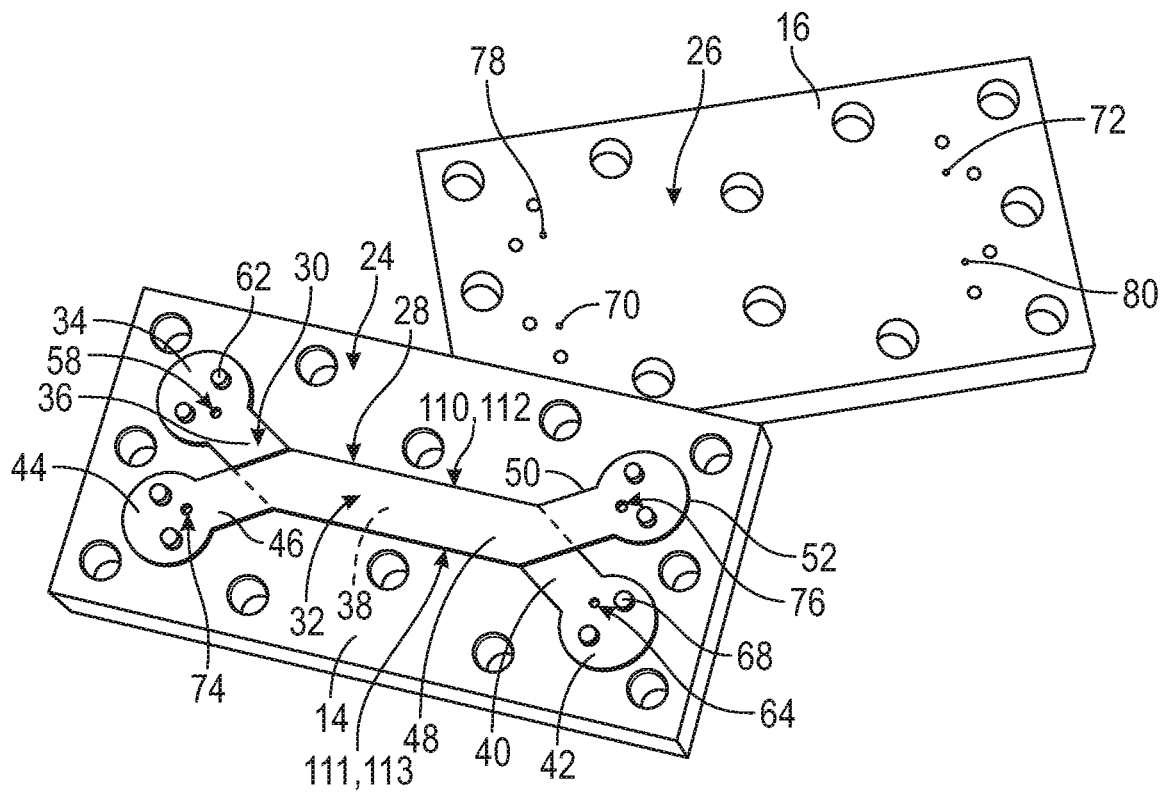
FIG. 2 is a perspective view showing the top of the microfluidic device of FIG. 1 with the housing disassembled to illustrate a liquid guide assembly of the device.

FIGS. 1 and 2 illustrate a representative example of a microfluidic device 10, according to one embodiment. The device 10 can include a housing 12 having a first housing portion 14 and a second housing portion 16 that can be assembled together to form the housing 12. In the illustrated embodiment, the housing portions 14 and 16 are configured as blocks of material defining a plurality of openings 18 configured to receive fasteners 20 to secure the housing portions together, although other configurations are possible.

The housing portions 14, 16 can have respective first surfaces (also referred to as exterior surfaces), such as first surface 22 of the second housing portion 16 shown in FIG. 1, and respective second surfaces (also referred to as interior surfaces) 24, 26 (FIG. 2). When the housing portions 14 and 16 are assembled together, the first surfaces (e.g., surface 22) can be located on the exterior of the housing 12, and the second surfaces 24 and 26 can be located on the interior of the housing 12 in an opposed arrangement. With reference to FIG. 2, a liquid guide assembly (also referred to as a liquid contactor assembly) 28 can be situated on the interior surface 24 of the first housing portion 14 such that the liquid contactor assembly 28 is sandwiched between the respective interior surfaces 24 and 26 of the housing portions 14 and 16 when the housing portions are assembled together.

Figure 4A:
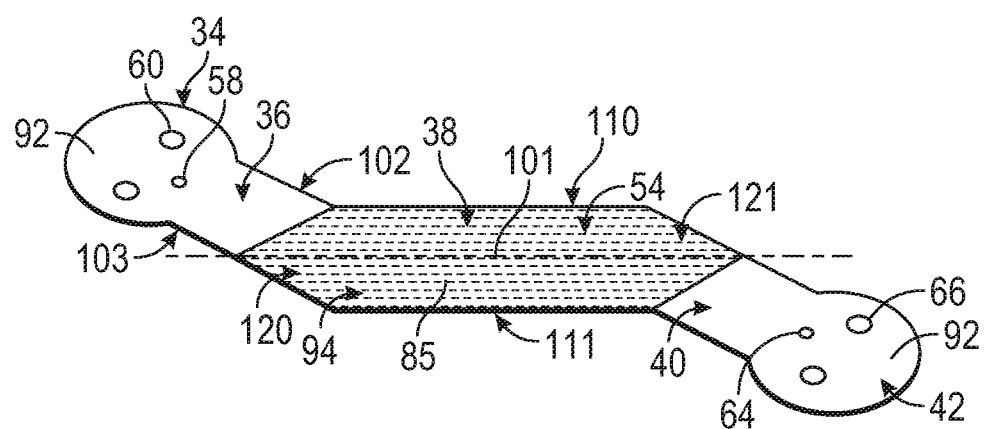
FIG. 4A is a perspective view showing the top of a representative embodiment of a liquid guide.

In the illustrated embodiment, the liquid contactor assembly 28 can include a first liquid guide 30 and a second liquid guide 32. With reference to FIGS. 2 and 4A, the first liquid guide 30 can include a first portion 34 configured as an inlet portion, and a second portion 36 extending at an angle from the first portion to a third portion 38 configured as a main portion. In certain embodiments, the main portion 38 can have two parallel longitudinal edges 110 and 111, and can extend along a major axis 101 of the liquid guide 30, as shown in FIG. 4A. A fourth portion 40 can extend from, and at an angle to, the main portion 38 on the opposite side of the main portion from the second portion 36, to a fifth portion 42 configured as an outlet portion. In the illustrated embodiment, the fourth portion 40 is parallel to the second portion 36 such that the first liquid guide 30 has a zigzag shape.

For example, in the illustrated embodiment, as viewed from the top, the second portion 36 can extend above, and at an angle to, the axis 101, and the fourth portion 40 can extend below, and at an angle to, the axis 101. In the illustrated embodiment, the inlet and outlet portions 34 and 42 have curved or round edges, while the edges of the intermediate portions 36, 38, and 40 are straight. However, the inlet and outlet portions 34 and 42 can also comprise any other suitable shape. Referring to FIG. 4A, in certain embodiments edges 102 and 103 of the second portion 36 can extend from the inlet portion 34 at an angle such that the edges 102 and 103 diverge from each other and the width of the second portion 36 increases with increasing distance from the inlet portion 34. The angle between the edge portions 102 and 103 can depend upon factors such as the width of the main portion 38, the length of the second portion 36, etc. In certain embodiments, the fourth portion 40 can be symmetric with the second portion 36 about the axis 101.

Returning to FIG. 2, the second liquid guide 32 can include a first portion 44 configured as an inlet portion and having an edge that forms part of a circle. A second portion 46 can extend at an angle from the first portion 44 to a third portion 48 configured as a main portion. A fourth portion 50 can extend from, and at an angle to, the main portion 48 on the opposite side of the main portion from the second portion, to a fifth portion 52 configured as an outlet portion. The edge of the outlet portion 52 can form part of a circle, similar to the inlet portion 44. The second and fourth portions 46 and 50 can be parallel to each other such that the second liquid guide 32 has a zigzag shape, similar to the first liquid guide 30.

Figure 3:
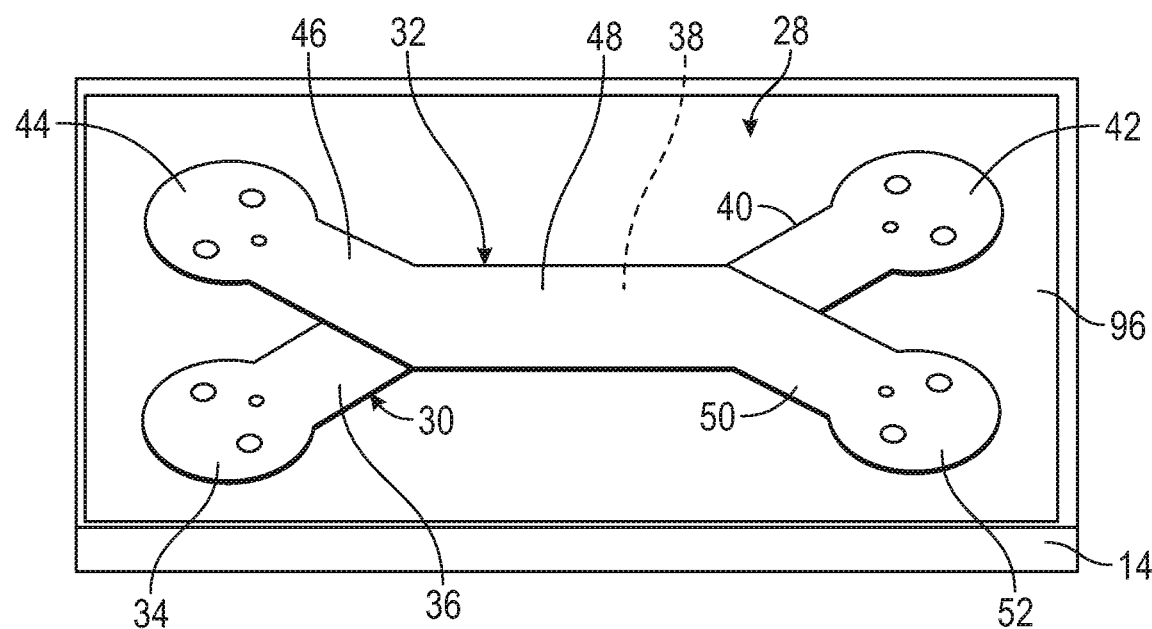
FIG. 3 is a perspective view showing the top of another embodiment of a liquid guide assembly on a lower portion of a housing.
Figure 11:
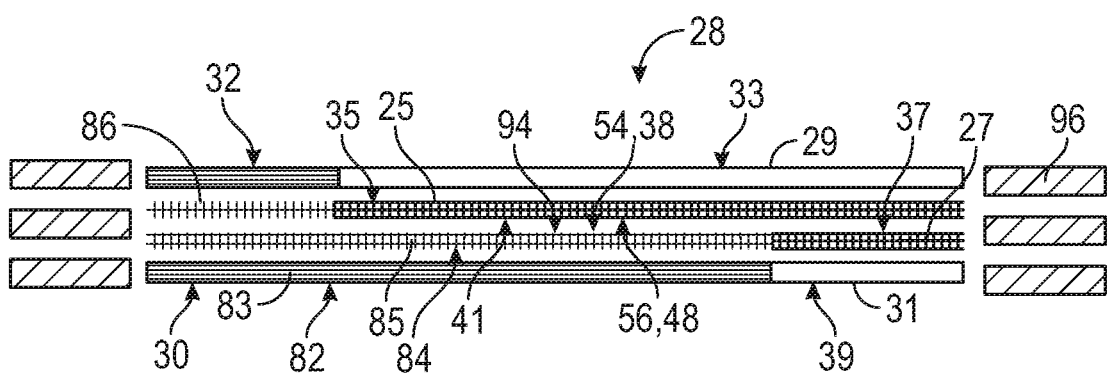
FIG. 11 is a side view schematically illustrating the components of the liquid guide assembly of FIG. 10 assembled together.

The main portion 38 of the first liquid guide 30 can have first and second surfaces (e.g., upper and lower surfaces, such as upper surface 54 shown in FIGS. 4A and 11), and the main portion 48 of the second liquid guide 32 can have first and second surfaces (e.g., upper and lower surfaces, such as lower surface 56 shown in FIG. 11). In the illustrated embodiment, the second liquid guide 32 can be placed on top of the first liquid guide 30 (or vice versa) such that the respective main portions 38 and 48 of the first and second liquid guides at least partially overlap. Stated differently, the first and second liquid guides 30 and 32 can be stacked or interleaved such that the upper surface 54 of the main portion 38 of the first liquid guide 30 is in contact with the lower surface 56 of the main portion 48 of the second liquid guide 32 along at least a portion of the main portions 38 and 48 (see, e.g., FIG. 11). In the illustrated embodiment, the main portions 38 and 48 of the respective liquid guides 30 and 32 can be parallel to each other such that the longitudinal edges 110 and 111 of the main portion 38 are aligned with the longitudinal edges 112 and 113 of the main portion 48, and such that the liquid guide assembly 28 has a dog bone shape. FIG. 3 illustrates an alternative embodiment of the device 10 in which the second portion 36 of the first liquid guide 30 extends downwardly in the figure and the fourth portion 40 extends upwardly, with the second liquid guide 32 in a complimentary configuration.

With reference to FIGS. 2 and 4A, the inlet portion 34 of the first liquid guide 30 can define an opening 58 configured as an inlet opening, and openings 60 (FIG. 4A) configured to receive members of the first housing portion 14 configured as alignment pins 62. The outlet portion 42 can define a corresponding outlet opening 64, and openings 66 (FIG. 4A) configured to receive alignment pins 68 (FIG. 2). With reference to FIG. 2, when the first liquid guide 30 is situated on the surface 24 of the first housing portion 14, the alignment pins 62 and 68 can be received in the respective openings 60 and 66 of the liquid guide such that the inlet opening 58 is aligned and in fluid communication with an inlet opening 70 defined in the second housing portion 16. The outlet opening 64 can also be aligned and in fluid communication with an outlet opening 72 defined in the second housing portion 16. The second liquid guide 32 can also include inlet and outlet openings 74 and 76 in fluid communication with respective inlet and outlet openings 78 and 80 of the second housing portion 16, along with openings configured to receive alignment pins similar to the first liquid guide 30.

With reference to FIG. 1, the second housing portion 16 can further include inlet fittings 47 and 49, and outlet fittings 51 and 53 through which liquids may be introduced into and/or withdrawn from the assembled housing 12. For example, the inlet fitting 47 can be in fluid communication with the first liquid guide 30 via the inlet opening 70 of the second housing portion 16, and the inlet opening 58 of the inlet portion 34 to allow liquid to be introduced to the first liquid guide. The inlet fitting 49 can be in fluid communication with the second liquid guide 32 via the inlet opening 78 of the second housing portion 16 and the inlet opening 74 of the inlet portion 44 to allow liquid to be introduced to the second liquid guide. At the opposite end of the housing 10, the outlet fitting 53 can be in fluid communication with the outlet opening 72 in the second housing portion 16, and with the outlet opening 64 of the outlet portion 42 such that liquid can be withdrawn from the first liquid guide 30. In a similar manner, the outlet fitting 51 can be in fluid communication with the outlet opening 80 in the second housing portion 16, and with the outlet opening 76 in the outlet portion 52 such that liquid can be withdrawn from the second liquid guide 32.

FIGS. 4A-8 illustrate the structure of the liquid guides 30 and 32 in greater detail. For ease of illustration, the following description proceeds with respect to the first liquid guide 30. However, in the illustrated embodiment, the second liquid guide 32 can have the same general structure as the first liquid guide, with certain components made from materials that are different from the corresponding components of the first liquid guide, as further described below.

Figure 4B:
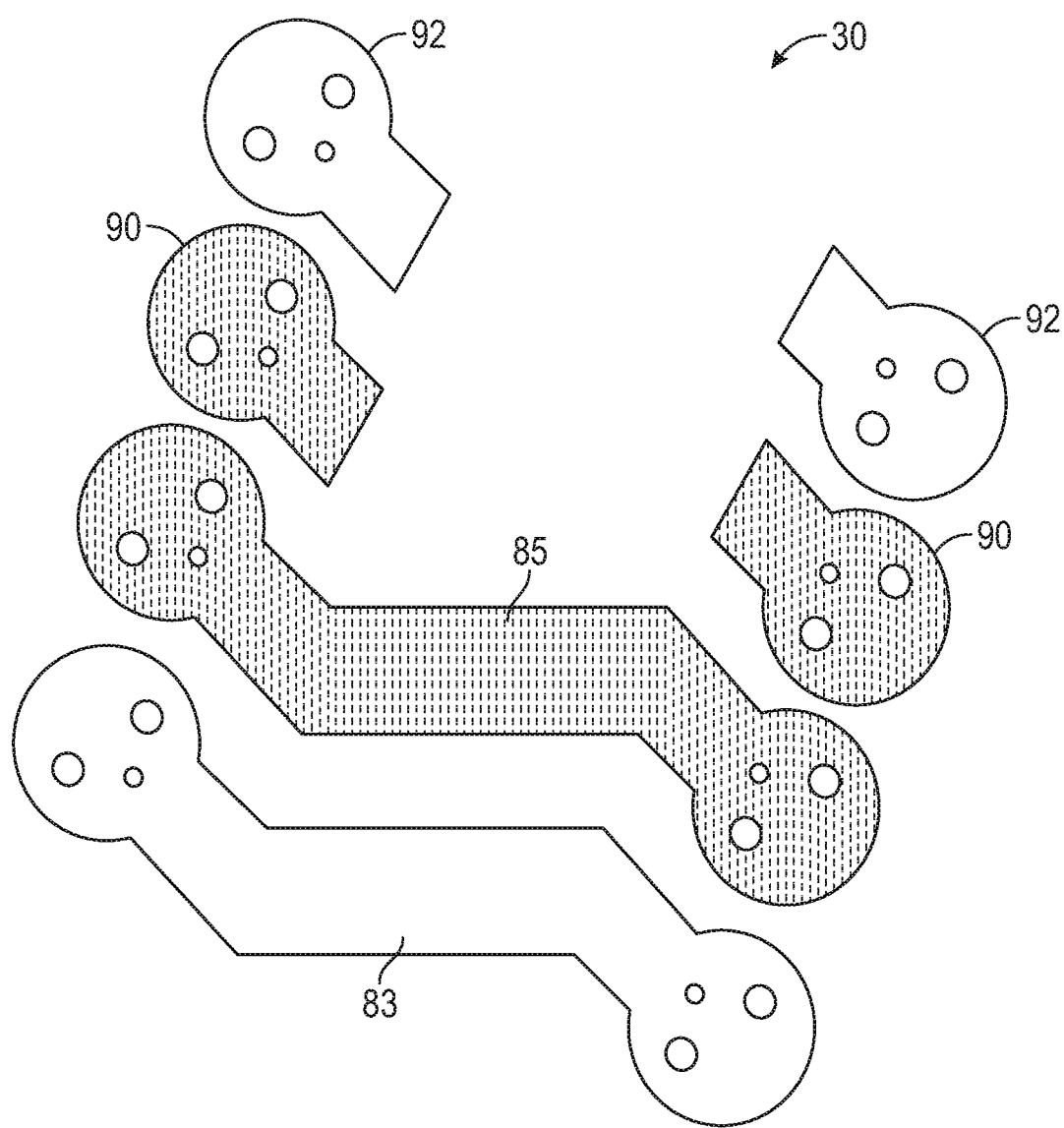
FIG. 4B is an exploded top plan view of the liquid guide of FIG. 4A disassembled for purposes of illustration.
Figure 4C:
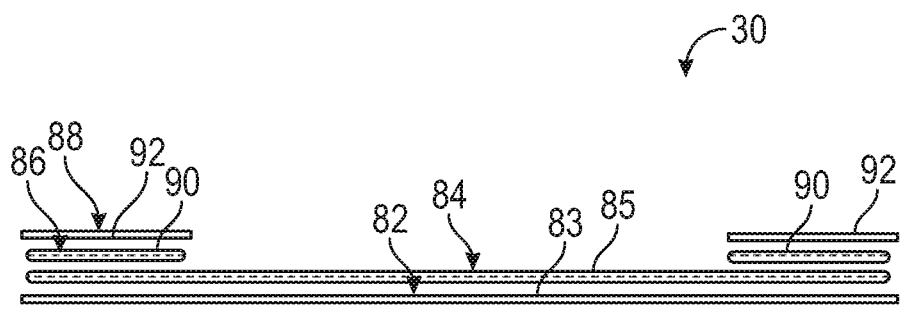
FIG. 4C is a side elevation view of the liquid guide of FIG. 4A.

In the illustrated embodiment, the first liquid guide 30 can include a plurality of layers arranged in a stacked arrangement. FIG. 4A illustrates the first liquid guide 30 in an assembled condition, FIG. 4B illustrates the constituent components of the first liquid guide 30 disassembled and laid flat for purposes of illustration, and FIG. 4C schematically illustrates a side view of the assembled liquid guide 30. Referring to FIG. 4C, the first liquid guide 30 can include a first layer 82, a second layer 84, a third layer 86, and a fourth layer 88, with each layer comprising one or more individual components.

Beginning with the first layer 82, the first layer 82 can be a member 83 configured as a solid (e.g., non-porous) member or sheet of material, as best shown in FIGS. 4B, 4C, and 5. As used herein, a "solid member" refers to a member that does not include pores or openings, and which is generally not liquid-permeable. Referring to FIG. 4B, the member 83 and, thereby, the first layer 82, can extend along the full length of the first liquid guide 30, and can have the zigzag shape of the assembled liquid guide. For example, with reference to FIG. 5, which is a bottom plan view of the member 83, the member 83 can include an inlet portion 34A having the same shape or substantially the same shape as the inlet portion 34 of the first liquid guide, a second portion 36A having the same or substantially the same shape as the second portion 36 of the first liquid guide, a main portion 38A having the same or substantially the same shape as the main portion 38 of the first liquid guide, a fourth portion 40A having the same or substantially the same shape as the fourth portion 40 of the first liquid guide, and an outlet portion 42A having the same or substantially the same shape as the outlet portion 42 of the first liquid guide.

The inlet portion 34A can include openings 60A corresponding to the openings 60 of the assembled first liquid guide, and configured to receive the alignment pins 62 (FIG. 2). The inlet portion 34A can also include an opening 58A, which can form part of the opening 58 of the first liquid guide 30 when the first liquid guide is assembled together. The outlet portion 42A can also include openings 66A configured to receive the alignment pins 68, and an opening 64A, which can form part of the opening 64 of the assembled first liquid guide 30. The respective edges 114 and 115 of the second portion 36A and/or the edges 116 and 117 of the fourth portion 40A can be angled toward each other to accommodate the width of the main portion 38A, as described above with respect to the assembled liquid guide 30.

Referring to FIGS. 4B and 6, the second layer 84 (also referred to as a liquid-conducting layer) can be a member 85 configured as a porous member or sheet of material. As used herein, a "porous member" refers to a liquid-permeable member that includes pores or openings such that liquid can flow through or along the member between the pores. The member 85 and, thereby, the second layer 84, can extend along the full length of the first liquid guide 30, and can have the zigzag shape of the assembled liquid guide, similar to the member 83. For example, the member 85 can include an inlet portion 34B having the same shape or substantially the same shape as the inlet portion 34 of the first liquid guide, a second portion 36B having the same or substantially the same shape as the second portion 36 of the first liquid guide, a main portion 38B having the same or substantially the same shape as the main portion 38 of the first liquid guide, a fourth portion 40B having the same or substantially the same shape as the fourth portion 40 of the first liquid guide, and an outlet portion 42B having the same or substantially the same shape as the outlet portion 42 of the first liquid guide. The inlet portion 34B can include openings 60B corresponding to the alignment pins 62, and an opening 58B corresponding to the opening 58. Similarly, the outlet portion 42B can include openings 66B corresponding to the alignment pins 68, and an opening 64B corresponding to the opening 64.

FIG. 7 illustrates a porous member 90. The porous member 90 can include a first portion 34C having curved or rounded edges 118 corresponding to the inlet portion 34 (or the outlet portion 42) of the first liquid guide 30, and a second portion 36C. In the illustrated embodiment, the porous member 90 has a length that is less than the overall length of the first liquid guide 30. As shown in FIGS. 4B and 4C, the first liquid guide 30 can include two members 90 that form the third layer 86, with one member 90 located at the inlet portion 34 and one located at the outlet portion 42 of the liquid guide. The second portion 36C can have two edges 104 and 105 extending from the first portion 34C and terminating at an edge 106. In the illustrated embodiment, the edges 104 and 105 are shown extending from the first portion 34C at a slight angle to each other such that the edges diverge (e.g., such that the width of the second portion 36C increases with increasing distance from the first portion 34C) similar to the edge portions 101 and 102 of the assembled liquid guide 30. In the illustrated embodiment, the edge portion 106 can extend between the edge portions 104 and 105 at an angle such that the edge portion 104 is longer than the edge portion 105, and such that the second portion 36C extends along at least a portion of the second portion 36 (or the fourth portion 40) of the assembled liquid guide. The inlet portion 34C can also include openings 60C corresponding to the alignment pins 62, and an opening 58C corresponding to the opening 58.

FIG. 8 illustrates a solid (e.g., non-porous) member 92. The solid member 92 can include a first portion 34D having curved or rounded edges 119 corresponding to the inlet portion 34 (or the outlet portion 42) of the liquid guide 30, and a second portion 36C. The solid member 92 can have a length similar to the length of the porous member 90, and which is less than the overall length of the first liquid guide 30. As shown in FIGS. 4A and 4B, two members 92 can be used to form the fourth layer 88, with one member 92 being located at each of the inlet and outlet portions 34, 42 of the liquid guide 30 and positioned on top of the members 90. The member 92 can include three edge portions 107, 108, and 109 configured similarly to the edge portions 104-106 of the member 90 of FIG. 7.

As mentioned above, the members 83, 85, 90, and 92 can be arranged in a stacked arrangement to form the layers 82-88 of the first liquid guide 30. For example, with reference to FIG. 4C, the solid member 83 can form the first layer 82, and the porous member 85 can be disposed on the solid member 83 to form the second layer 84. Referring to FIGS. 4B and 4C, two porous members 90 can be situated on the inlet and outlet ends of the porous member 85 to form the third layer 86. Similarly, two solid members 92 can be arranged on the porous members 90 to form the fourth layer 88. The respective openings defined in each of the constituent members 83, 85, 90, and 92 can be coaxially aligned with each other to form the openings 58, 60, 64, and 66 of the assembled liquid guide 30. Referring to FIG. 4A, in the illustrated embodiment the area of the porous member 85 that is exposed between the members 92, and which corresponds to the surface 54 of the liquid guide 30, can have an irregular hexagonal shape defined by the edges 110 and 111, and by the pointed end portions 120 and 121 that are shown bisected by the axis 101. One or more of the constituent members 83, 85, 90, or 92 may be bonded to the neighboring member(s) (e.g., by adhesive, welding, etc.), or the members may be unbonded, depending upon the particular characteristics desired.

In certain embodiments, the first liquid guide 30 can define a flow path from the inlet 70 to the outlet 72 for liquid introduced into the housing 12. In particular embodiments, the porous member 85 can be configured to conduct liquid along its length while retaining the liquid generally within the boundaries of the volume of the porous member by capillary action. In this manner, the layer 84, which comprises the porous member 85, can be a liquid-conducting layer, and the flow path of the first liquid guide 30 can be defined along the length of the layer 84 from the inlet 58 to the outlet 64.

Figure 9:
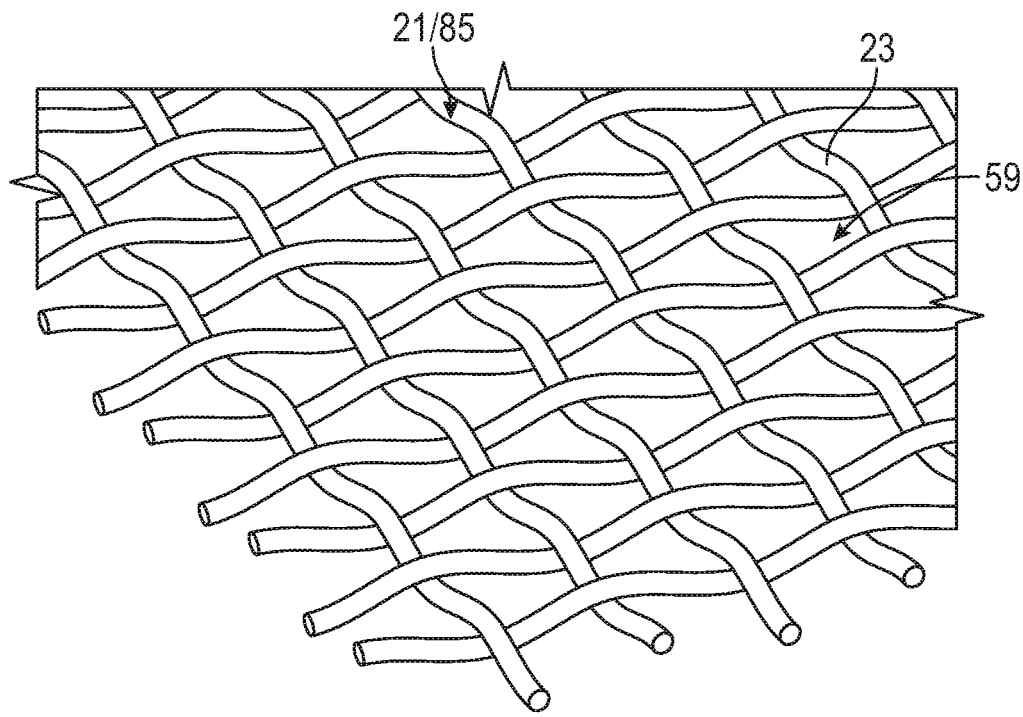
FIG. 9 is a magnified perspective view of a porous member configured as a wire screen, according to one embodiment.

For example, in one representative embodiment, the porous member 85 can be a mesh or screen, such as the screen 21 illustrated in FIG. 9. The screen 21 can comprise a plurality of fibers or filaments 23 woven together in, for example, an over one under one pattern, although any suitable weave pattern may be used. The filaments 23 can define a plurality of openings or pores 59 between the filaments. The filaments 23 can conduct liquid between the pores 59 along the length of the screen 21 by capillary action and/or by the application of a pressure gradient. In addition to screens, the porous member can also be made from any other suitable porous material or construction, such as sheet stock (e.g., metallic or polymeric) expanded to create pores or a mesh, woven or non-woven fabric, etc. In some embodiments, the screen 21 can have a thickness of from 10 µm to 500 µm, and a pore size (e.g., diameter) of from 10 µm to 100 µm. In a representative embodiment, the screen 21 can have a thickness of 70 µm, a wire diameter of 35 µm, and a pore size of 35 µm, where the pore size is measured along the sides of the square pores in FIG. 9. In some embodiments, the porous member 85 can have an open area of 10% to 50%, 15% to 40%, or 20% to 30%, depending on the wire diameter, wire spacing, etc. In particular embodiments, the porous member can have an open area of 22%. As used herein, the term "open area" refers to the proportion of the area of a porous member that is open space.

In some examples, the porous member 85 can be made from a material that is wettable by the particular liquid to be flowed along the liquid guide 30. For example, where the liquid to be flowed is aqueous, the porous member 85 can be made from any of various hydrophilic and/or oleophobic materials, such as stainless steel, tantalum, titanium, glass, quartz, etc. As used herein, the term "hydrophilic material" refers to a material wherein a water droplet on a surface of the material forms a contact angle of less than 90 degrees. In some embodiments, the affinity of the material for the liquid to be flowed through the liquid guide can be enhanced with any of various surface treatments. For example, in embodiments where the liquid to be conducted along the liquid guide 30 is aqueous, the porous member 85 can be made of stainless steel coated with, for example, glass, tantalum, titanium, etc., or a thin oxide film (e.g., created with a flame treatment), to increase the hydrophilicity of the porous member 85. In certain embodiments, the solid member 83, the porous members 90, and the solid members 92 can be made of the same or similar material as the porous member 85 to promote liquid flow along the first liquid guide 30. However, in alternative embodiments, any of the members 83, 85, 90, or 92 can be made of the same or different materials, depending upon the particular characteristics desired.

Figure 10:
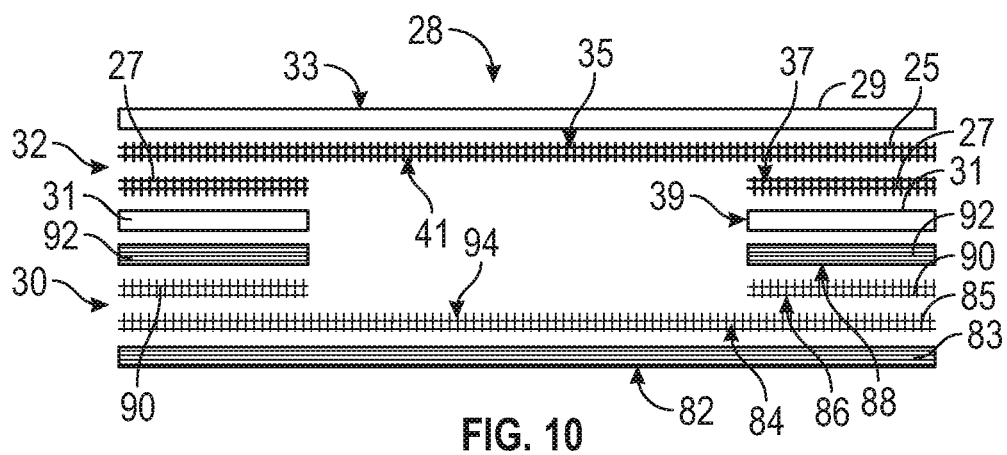
FIG. 10 is an exploded side view schematically illustrating a representative embodiment of a liquid guide assembly including a first liquid guide and a second liquid guide with the layers of each liquid guide shown separated from each other for purposes of illustration.

FIG. 10 illustrates a side view of the first and second liquid guides 30 and 32, with all of the components of the liquid guide 32 shown above the components of the liquid guide 30, and with the constituent layers of both liquid guides separated for purposes of illustration. As shown in FIG. 10, the second liquid guide 32 can have a similar construction to the first liquid guide 30, with porous members 25 and 27, and solid members 29 and 31, arranged to form layers 33, 35, 37, and 39. As noted above, the solid members 29 and 31 can be similar in size and shape to the corresponding members 83 and 92 of the first liquid guide, and the porous members 25 and 27 can be similar in size and shape to the corresponding porous members 85 and 90 of the first liquid guide. Additionally, the second liquid guide 32 can include two porous members 27, one at the inlet and one at the outlet of the liquid guide, which can together form the layer 37. The second liquid guide 32 can also include a solid member 31 at the inlet and a solid member 31 at the outlet which together form the layer 39, similar to the first liquid guide 30. The solid member 29 and the porous member 25 can extend along the entire length of the second liquid guide 32.

The members 25-31 of the second liquid guide 32 can be made from one or more materials having an affinity for a liquid to be flowed along the second liquid guide, similar to the first liquid guide. For example, in certain embodiments the layer 35 of the second liquid guide 32 can be a liquid-conducting layer, similar to the layer 84 of the first liquid guide 30. In certain embodiments the porous member 25 can be a mesh or screen similar to the screen 21 of FIG. 9, and can be configured to conduct liquid along its length by capillary action and/or by the application of a pressure gradient, as described above.

In the illustrated embodiment, the layers of the second liquid guide 32 can be arranged in the opposite order of the corresponding layers of the first liquid guide 30. For example, the members 27 and 31 can be disposed between the surface 24 of the housing portion 14 and the members 29 and 25 such that the members 29 and 25 are spaced apart or offset from the surface 24, and such that the porous member 25 of the second liquid guide 32 is positioned adjacent and/or in contact with the corresponding porous member 85 of the first liquid guide 30.

For example, the liquid guides 30, 32 can be oriented such that the respective solid members 92 and 31 contact the inner surfaces of the housing portions when the liquid guides are assembled in the housing, and such that respective central portions 94 and 41 of the porous members 85 and 25 are adjacent (e.g., contacting) one another. FIG. 11 is a side view of the liquid guides 30 and 32 assembled to form the liquid guide assembly 28 viewed from the end on the left side of FIG. 2. Because the view in FIG. 11 is in a direction to the right in FIG. 2, all four layers 82-88 of the first liquid guide 30 can be seen on the left side of the figure. Meanwhile, all four layers 33-39 of the second liquid guide 32 can be seen on the right side of the figure. The central portions 94 and 41 of the porous members 85 and 25 can be seen overlapping each other. This can allow a first liquid to flow along the first liquid guide 30 (e.g., held in place by capillary action along the porous member 85), and a second liquid, which may be immiscible with the first liquid, to flow along the second liquid guide 32 (e.g., by capillary action along the porous member 25) in the manner of two-phase liquid-liquid flow. The first and second liquids can form a liquid interface along the central regions 94 and 41 of the respective porous members 85 and 25. This can allow the liquids, or solutes dissolved in one or both liquids, to interact along the length of the main portions 38 and 48 of the liquid guides 30 and 32, without mixing the liquids. This can also allow the transfer of heat from one liquid to the other. In other words, the liquid guides 30 and 32 can bring liquids conducted along the respective liquid guides into contact with one another such that interactions, such as heat or mass transfer, can occur between the liquids without mixing the liquids.

For example, in certain embodiments, the first liquid guide 30 can be configured to conduct an aqueous liquid, and the second liquid guide 32 can be configured to conduct a non-aqueous liquid, such as an organic liquid. As used herein, an "organic liquid" refers to a liquid comprising one or more organic compounds that include one or more carbon atoms joined by covalent bonds, or mixtures or solutions thereof. Exemplary organic liquids include xylenes, toluenes, acetone, etc. In some examples, the component members 83, 85, 90, and 92 of the first liquid guide 30 can be made from hydrophilic and/or oleophobic material(s), and the members 25-31 can be made from hydrophobic and/or oleophilic material(s) selectively wettable by the non-aqueous liquid. As used herein, the term "hydrophobic material" refers to a material wherein a water droplet on a surface of the material forms a contact angle of greater than 90 degrees. In a representative embodiment, the component members 83, 85, 90, and 92 of the first liquid guide 30 can be made from a material that is hydrophilic and oleophobic (e.g., stainless steel). The members 25-31 of the corresponding second liquid guide 32 can be made from a material that is hydrophobic and oleophilic (e.g., polyether ether ketone (PEEK)).

Figure 12:
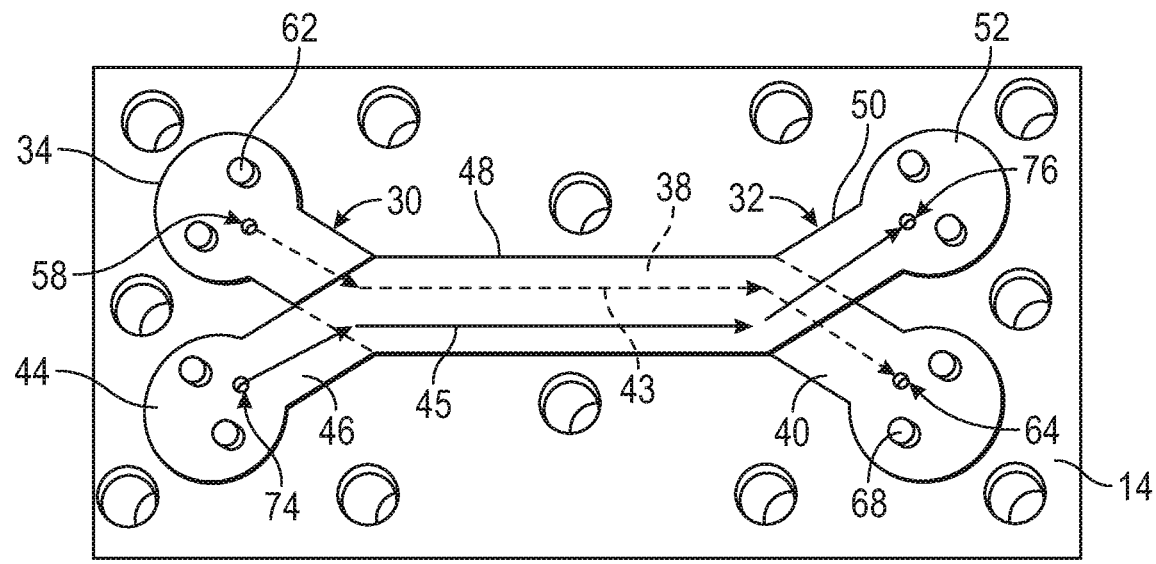
FIG. 12 is a perspective view showing the top of an embodiment of a liquid guide assembly illustrating liquid flow through the liquid guides in the same direction.

With reference to FIG. 12, a first liquid introduced through the inlet 58 can flow along the first liquid guide 30 in the direction of arrows 43 toward the outlet 64, and a second liquid introduced through the inlet 74 can flow along the second liquid guide 32 in the direction of arrows 45 toward the outlet 76. More specifically, the first liquid can flow along the member 85 of the liquid-conducting layer 84 of the first liquid guide 30, and the second liquid can flow along the member 25 of the liquid-conducting layer 35 of the second liquid guide 32. The two liquids can come into contact with one another along the length of the main portions 38 and 48 of the liquid guides 30 and 32, and more particularly along the main portions 94 and 41 of the porous members 85 and 25, and interact as described above. The liquid flows can then diverge at the respective fourth portions 40 and 50 of the liquid guides toward the respective outlets 64 and 76, with little or none of the second liquid entrained in the first liquid, and vice versa. The liquids can then be collected from the respective outlets 52 and 64 (e.g., via the outlet ports 51 and 53 of the housing).

In the illustrated embodiment, one or more seal members 96 (also referred to as gaskets) can be arranged along the perimeter of the stacked liquid guides 30 and 32 to seal the liquid guides, as shown in FIGS. 3 and 11. With reference to FIGS. 3 and 11, one or more seal members 96 configured as sheets of material can be arranged on the surface of the housing 14 such that a thickness of the seal members corresponds to a height of the liquid guide assembly 28. For example, three layers of sealing material are illustrated in FIG. 11, although the device may include more or fewer layers, as desired. This can alleviate the need for additional components to seal the sides of the liquid guides 30 and 32. In some embodiments, the sealing members 96 can surround the liquid guide assembly 28. For example, with reference to FIG. 3, the sealing members 96 can define an opening having the approximate size and shape of the liquid guide assembly 28 and configured to receive the liquid guide assembly.

Figure 13:
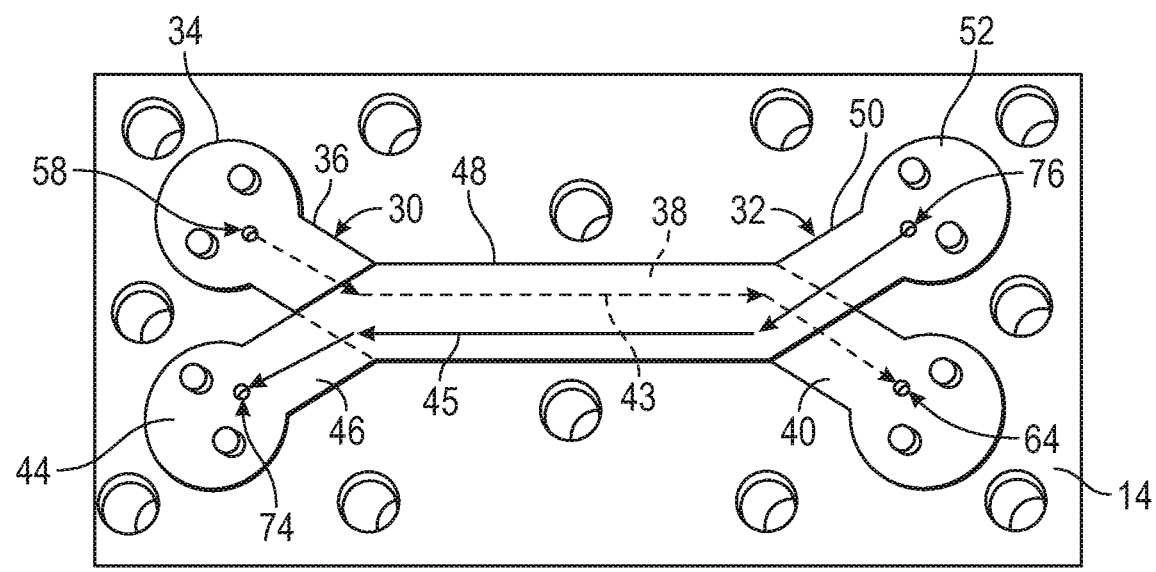
FIG. 13 is a perspective view showing the top of an embodiment of a liquid guide assembly illustrating liquid flow through the liquid guides in opposite directions.

FIG. 12 illustrates co-current flow of liquids through the liquid guides 30, 32, wherein the respective inlets and outlets of each liquid guide are located on the same side of the device, and the liquids flow in the same direction through the respective main portions 38, 48 of the liquid guides. FIG. 13 shows a counter-current (or dual flow) configuration of the device, in which the inlet 58 of the first liquid guide 30 is located on the opposite side of the device from the inlet 76 of the second liquid guide 32, and the two liquids flow in opposite directions through the main portions 38 and 48 of the liquid guides. The microfluidic devices described herein can also be configured to provide serpentine flow in two dimensions, or in three dimensions (e.g., between liquid guides in a stacked arrangement).

The disclosed microfluidic liquid contactor embodiments can have significant advantages over known microfluidic devices. For example, use of porous members such as members 85 and 25 create a large surface area system of pores and filaments that conduct the respective liquids via capillary action and prevent the liquids from mixing. Flow of the liquids along the filaments of the porous members 85 and 25 can be laminar or turbulent. For example, in certain configurations flow along the porous members 85 and 25 can induce turbulent flow regimes in the liquids, increasing interaction and mass transfer between the liquids. By layering the liquid guides as described above, the disclosed embodiments can more accurately maintain the thickness of the device and/or the spacing between layers during operation (e.g., under operating pressure) than known devices. For example, in configurations in which the components of the liquid guides are not bonded to each other, the individual components, and/or layers comprising multiple components, can move or flex relative to each other during device operation without placing undue stress on the assembly. In some embodiments, the porous members 85 and/or 25 can also provide structural support for the liquid guide assembly, allowing long, wide, and/or shallow flow paths or fluid channels to be created without collapsing. For example, the porous members 85 and 25 can provide structural support to the non-porous layers 82 and 33 to reduce or prevent deflection of the non-porous layers (e.g., when under operating pressure).

The porous and non-porous members, in combination with the housing and the gasket layers, can also improve the mechanical flexibility of the device, making the device more durable and less prone to failure over prolonged use. This can also be advantageous during device assembly, as the porous members 85 and 25 can flex during assembly, allowing the various members and gaskets to form a seal. This can also reduce the required production tolerances of the components, lowering costs and increasing yield.

In certain embodiments, the Young's modulus of the material of the housing 12 can be greater than or equal to the Young's modulus of the material of the seal members 96. In some examples, the Young's modulus of the housing material can be about two times greater than the Young's modulus of the seal members. For example, in a representative embodiment the seal members 96 can be made of ethylene-tetrafluoroethylene (ETFE) having a Young's modulus of less than or equal to 2 GPa, and the housing 12 can be made of PEEK having a Young's modulus of 4 GPa. This can facilitate more even pressure distribution across the seal members 96.

In certain embodiments, the porous members 85 and/or 25 can have a Young's modulus less than or equal to the Young's modulus of the seal members 96. This can allow the porous members 85, 25 to flex together with the housing 12 and the seal members 96 as, for example, pressures fluctuate in the liquid guides. Thus, in a representative embodiment where the seal members 96 have a Young's modulus of less than or equal to 2 GPa, the porous member 85 can have a Young's modulus of less than or equal to 2 GPa, and the porous member 25 can have a Young's modulus of less than or equal to 2 GPa.

In some embodiments, the microfluidic device 10 can be configured to operate in a microscale (e.g., less than or equal to 100 μm) flow regime. In some embodiments, this microscale flow regime can be independent of the length or width of the individual liquid guides. In a representative embodiment with an inlet pressure of 3 psi, flow rates of from 60-150 μL per minute can be achieved (e.g., with a single liquid guide assembly 28) without significant mixing of the two liquids. In other embodiments including multiple liquid guide assemblies, flow rates of 1 mL per minute or more can be achieved. In certain configurations, the disclosed embodiments can be useful in a variety of industries, including food processing, the petroleum industry, analytical chemistry applications such as liquid chromatography, desalination, waste or effluent treatment, and trace element purification, to name a few.

Figure 14:
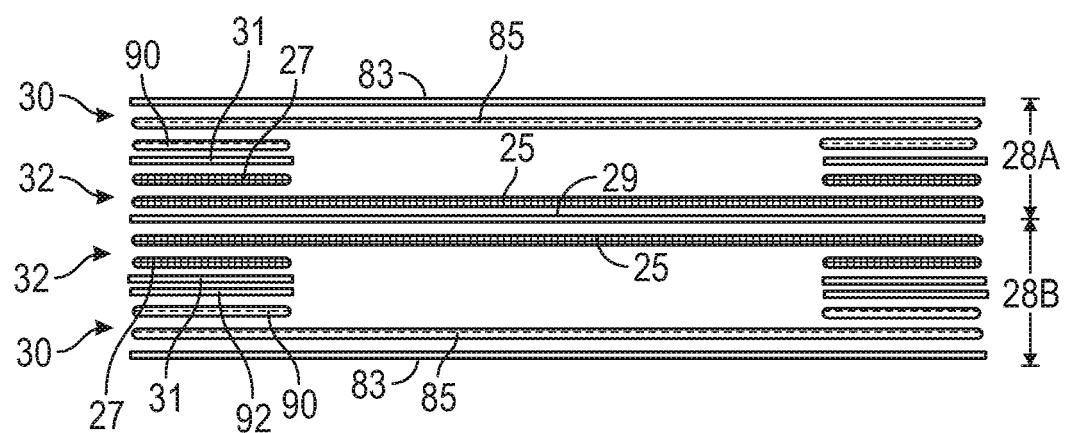
FIG. 14 is a side view of a device including two liquid guide assemblies, where each liquid guide assembly includes a first liquid guide and a second liquid guide.
Figure 15:
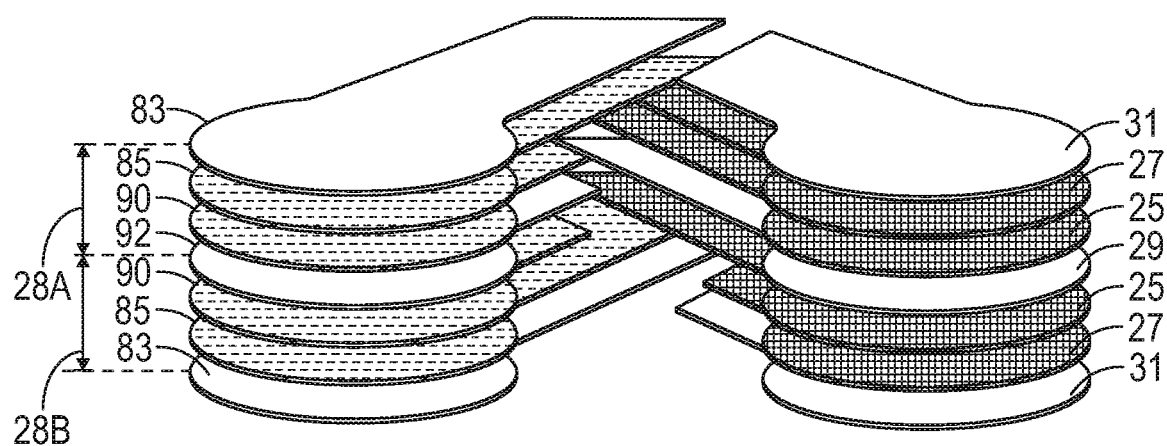
FIG. 15 is a perspective view of an end portion of the device of FIG. 14 illustrating the layers of the liquid guides separated from each other for purposes of illustration.

The disclosed embodiments can also be scaled to increase throughput. For example, multiple liquid guide assemblies 28 including a first liquid guide and a second liquid guide can be stacked. A system including two liquid guide assemblies 28A and 28B is illustrated in FIGS. 14 and 15. Each liquid guide assembly 28 includes a first liquid guide 30 and a second liquid guide 32 having the constituent layers as described above. The liquid guide assemblies 28A and 28B are arranged such that the respective porous members 25 of the second liquid guides 32 are adjacent one another, and the porous members 85 of the first liquid guides 30 are spaced apart from one another across the thickness of the assembly. In the illustrated embodiment, the uppermost liquid guide 30 need not include solid members 92 (i.e., the uppermost liquid guide 30 includes only three layers instead of four layers), although the liquid guide 30 may also include all four layers, as desired.

Figure 16:
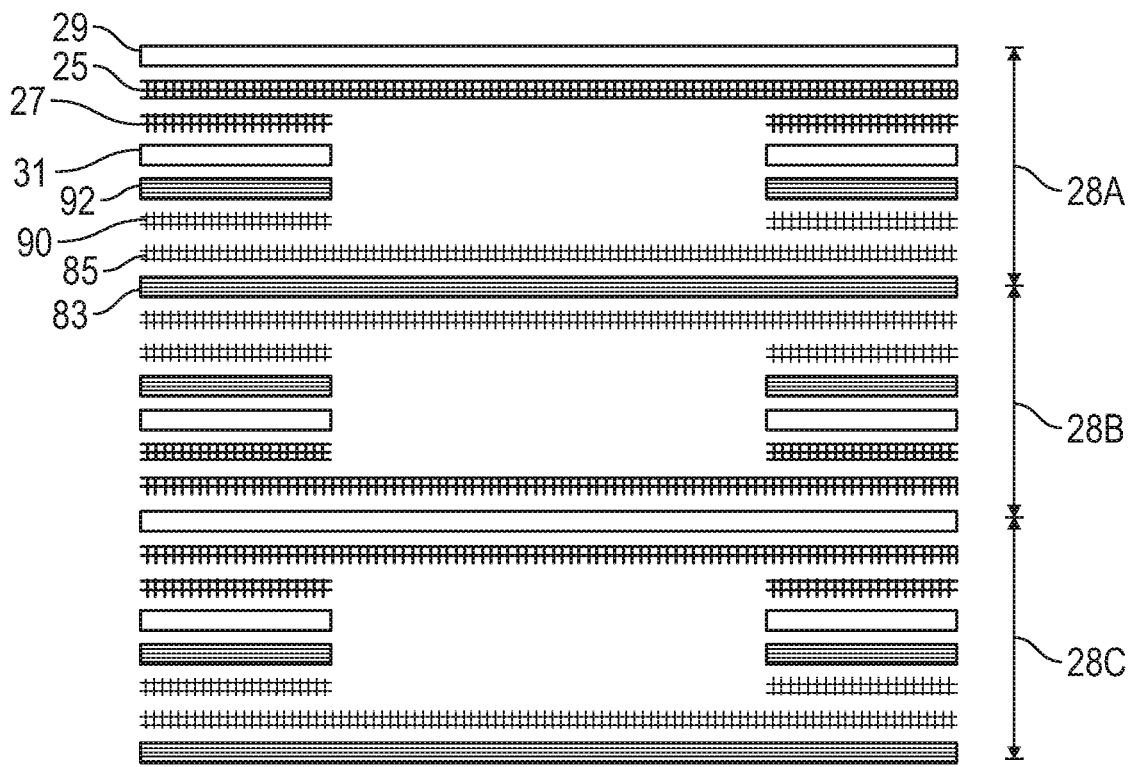
FIG. 16 is an exploded side view of a device including three liquid guide assemblies with the components shown spaced apart for purposes of illustration.
Figure 17:
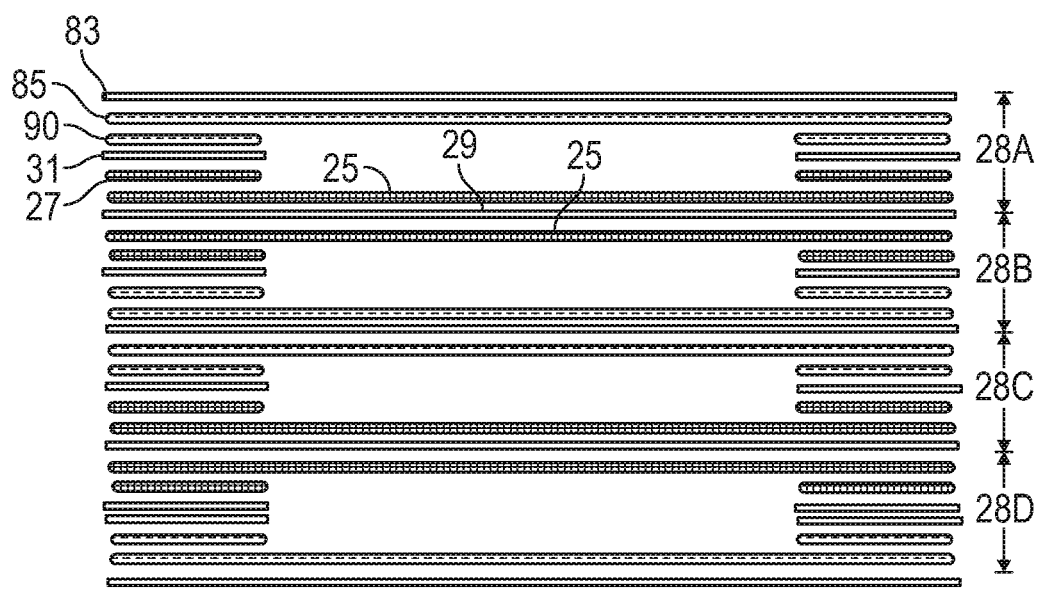
FIG. 17 is a side view of a device including four liquid guide assemblies with the components shown spaced apart for purposes of illustration.
Figure 20:
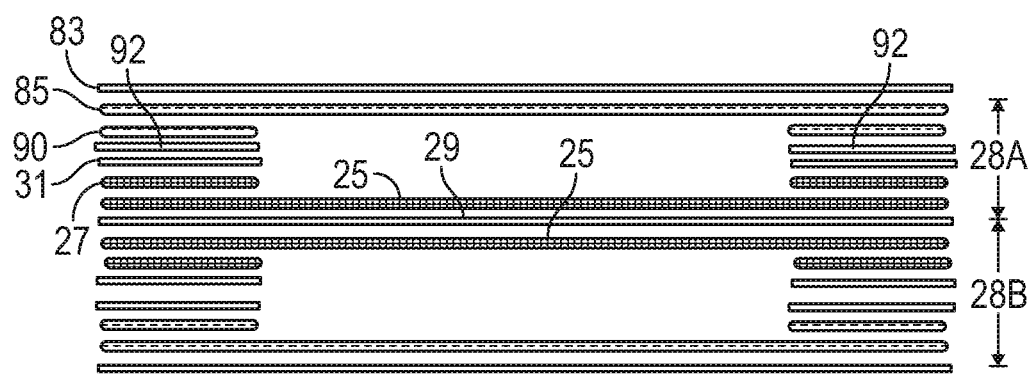
FIG. 20 is a side view illustrating a device with two liquid guide assemblies in which the uppermost liquid guide includes solid members and the lowermost liquid guide includes solid members, and in which the components are spaced apart for purposes of illustration.
Figure 21:
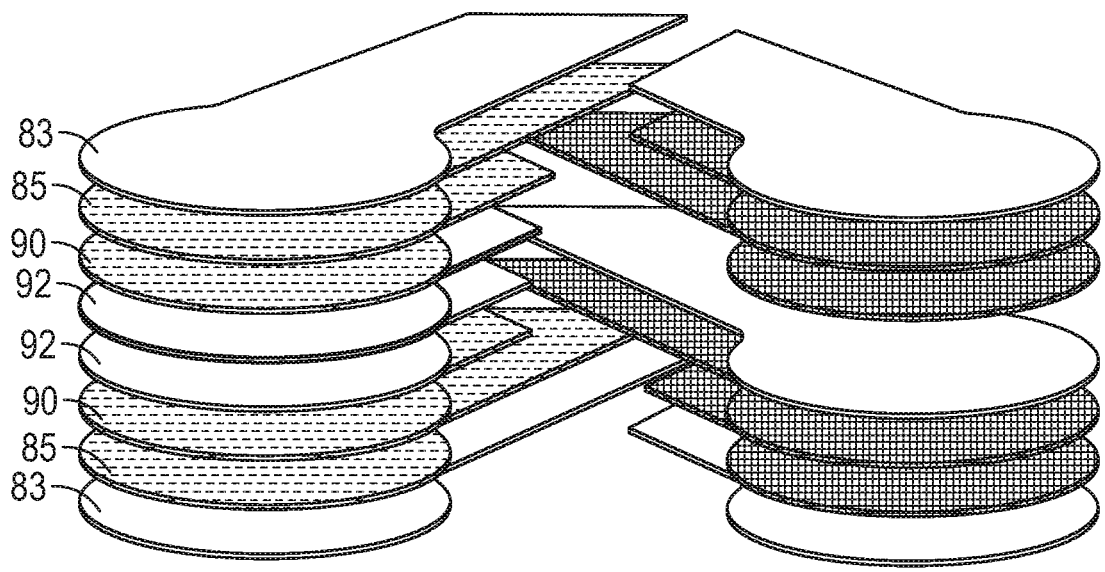
FIG. 21 is a perspective view of an end portion of the device of FIG. 20.
Figure 22:
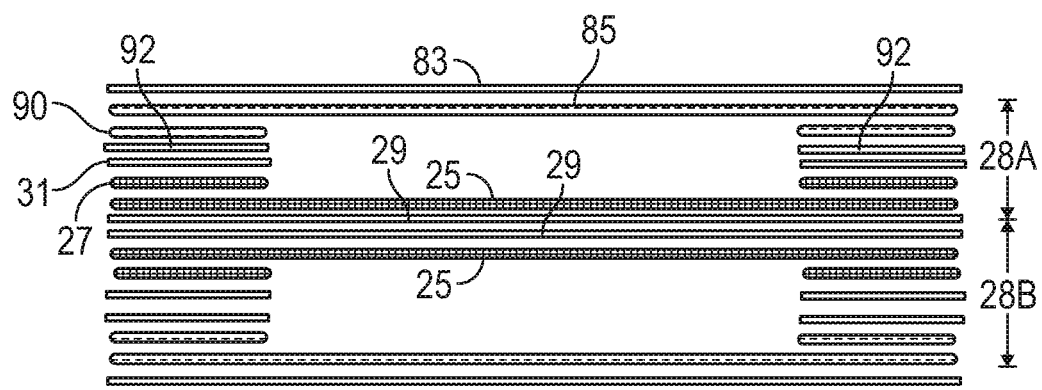
FIG. 22 is a side view illustrating a device including two liquid guide assemblies having two solid members at the center of the device.
Figure 23:
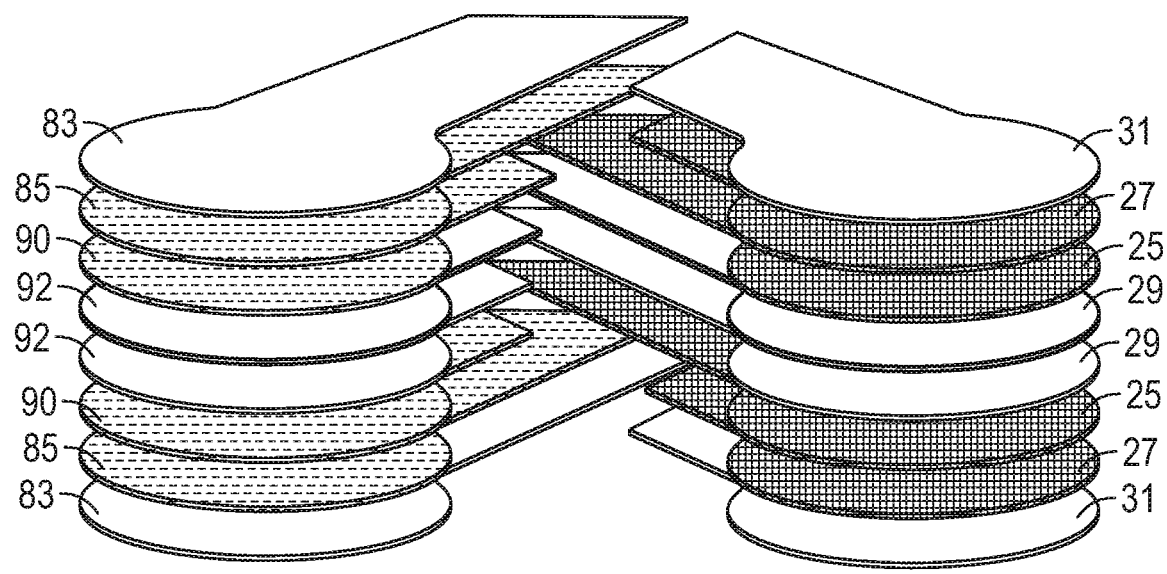
FIG. 23 is a perspective view of an end portion of the device of FIG. 22.

FIGS. 16 and 17 illustrate a system including three liquid guide assemblies 28A-28C, and FIG. 17 illustrates a system including four liquid guide assemblies 28A-28D. FIGS. 20-23 illustrate alternative embodiments of the microfluidic device 10. For example, FIGS. 20 and 21 illustrate a device with two liquid guide assemblies 28A and 28B, in which the uppermost liquid guide 30 includes solid members 92, and the lowermost liquid guide 30 includes solid members 92. FIGS. 22 and 23 illustrate another alternative embodiment in which the assembly includes two solid members 29 at the center of the device, in addition to the additional solid members 92 of FIGS. 20 and 21. Additionally, although the various members in FIGS. 15, 21, and 23 are schematically shown without the inlet, outlet, and alignment pin openings for ease of illustration, the members may include such openings as shown and described herein.

EXAMPLE 1

Figure 19:
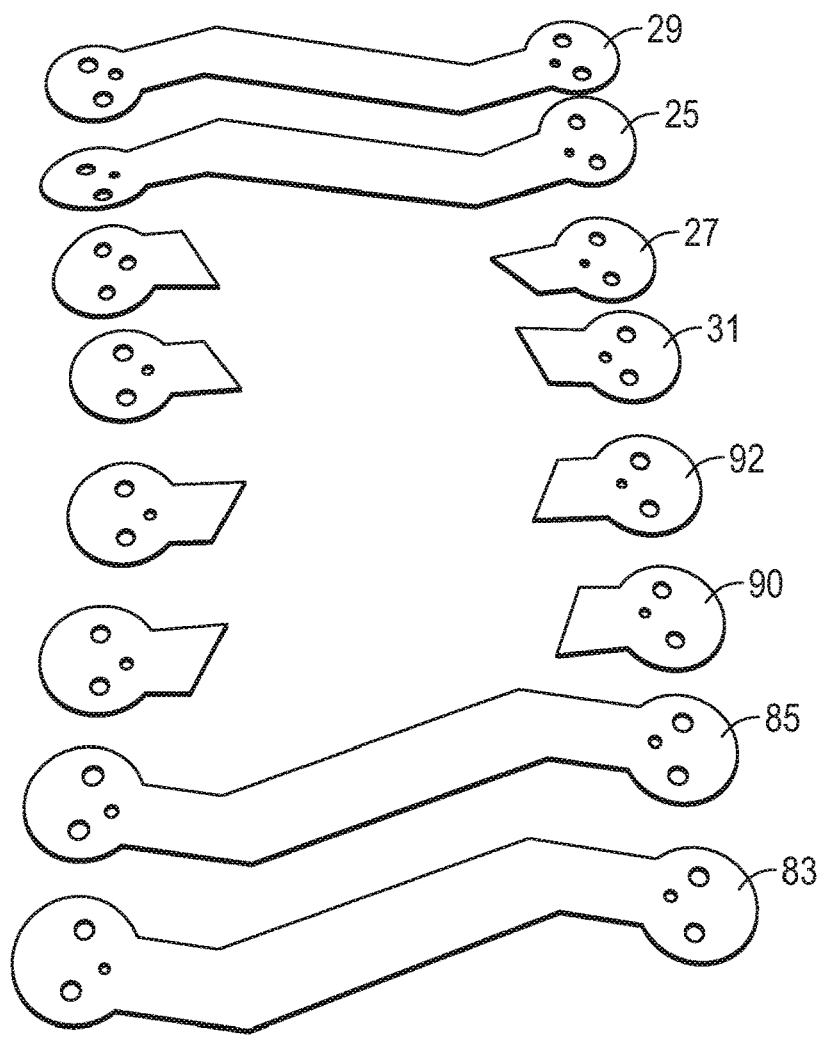
FIG. 19 is an exploded perspective view illustrating the porous and non-porous components of the liquid guides of a liquid guide assembly, according to one embodiment.

The following example provides a representative method of assembling and testing a microfluidic device according to the embodiments described herein. FIG. 19 illustrates the components of a liquid guide that can be assembled to form a liquid guide assembly as described herein.

Cleaning and Preparation

The parts of the screen contactor, excluding the ethylene-tetrafluoroethylene (ETFE) layers, can be placed into a clean petri dish with a few mL of isopropanol and sonicated for, e.g., 5 minutes. This process can be repeated in new petri dishes with methanol, and then hexane. The inside faces of the housing can be wiped with isopropanol. The layers of ETFE can be wiped with isopropanol. After allowing the hexane to evaporate from the stainless steel (SS) pieces, a flame can be applied to both sides, heating each component evenly to get it red-hot, taking care not to warp the pieces. The stainless steel components can be rinsed with de-ionized water. The flame/water treatment process can help to ensure water adhesion to the SS pieces in the Screen Contactor.

Single Layer Device Construction

On the bottom piece of housing (e.g., housing portion 14), stack the stainless steel pieces using the alignment pins in the following order, bottom to top: solid sheet (e.g., solid member 83), screen channel (e.g., porous member 85), screen cap (e.g., porous member 90), and solid cap (e.g., solid member 92). Crossing over the stainless steel pieces, stack the air-dried PEEK pieces in the following order, bottom to top: solid cap (e.g., member 31), screen cap (e.g., member 27), screen channel (e.g., member 25), and solid channel (e.g., member 29). For some embodiments of a single layer device, stack 3 ETFE gasket layers 96 onto the housing, around the dog-bone of the liquid guide assembly 28. The top view of the device can look like FIG. 3. On the second housing portion, insert the inlet and outlet tubing connected via IDEX fittings 47-53. The tubing can be flush with the end of the IDEX fittings. Place the second housing portion 16 onto the first housing portion 14 and the assembled liquid guides so that the alignment pins hold the two together. Insert the screws (e.g., 12 screws) into the threaded through-holes and tighten evenly with a torque wrench.

Syringes and Testing

Figure 18:
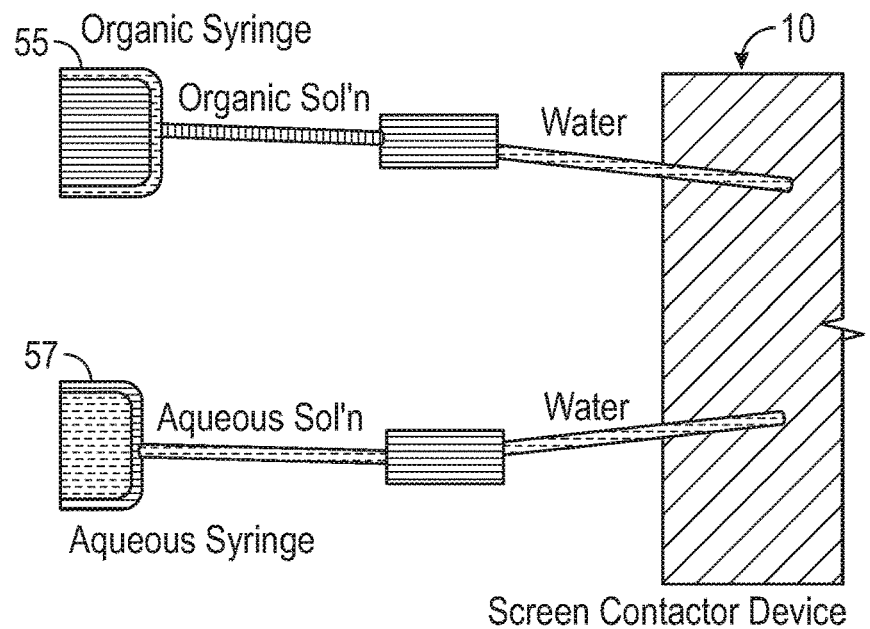
FIG. 18 is a schematic illustration of a system for introducing two different liquids into a liquid guide assembly.

Connect a syringe loaded with 5 mL DI water to the water inlet tubing (leading to stainless steel), and flush the system with water. Water may leak out of the other inlet and the outlets. This step can purges air from the system. Insert both ends of outlet tubing into separate collection vials. After removing the water-loaded syringe, fill two other syringes: one with an aqueous phase, and the other with an organic phase. Ensure that they are both filled to the same volume. Dying one phase can be helpful for visualizing carryover. In some embodiments, the organic phase is dyed with Oil Blue N. With reference to FIG. 18, connect the aqueous syringe 57 to a piece of tubing (again using IDEX parts), and purge the tubing with water to remove air. Connect this tubing to the water inlet tubing using an IDEX connector. Connect the organic syringe 55 to another piece of tubing in the same manner, purge this tubing with organic phase to remove air, and connect it to the organic inlet tubing. Place both syringes into the syringe pump and tighten down to hold them in place. At this point, the system may be air-free, although there may also be air in the fitting connecting the two pieces of tubing.

To establish the flow field without interruption, it may help to start the flow of the syringe pump at a low flowrate (e.g., 5 or 10 µL/min). Choosing the best starting flowrate may depend on the interfacial tension of the two fluids: if the interfacial tension is high, and a surfactant is not being used, a flow field can be established at 10 µL/min in some embodiments; if the interfacial tension is low or unknown, or a surfactant is being used, 5 µL/min may be a better starting flowrate.

After a few minutes, the organic and aqueous solutions can be observed in the outlet tubing. It is possible that the organic outlet tubing may contain aqueous carryover, due to the system first being flushed with water. This carryover should not be present after the volume of the device has been cleared. For a single-layer device, this volume can be 60 µL, in one representative embodiment.

Once the flow field has been established and carryover is not observed in either outlet, stop the flow for one to three minutes to allow the system to equilibrate. After the pause, increase the flowrate incrementally. The increment can be chosen to be 5 µL, but 2 µL may be more effective for sensitive systems that are prone to carryover at low flowrates, in certain embodiments.

As the device flows, observe carryover in both outlets. When carryover is observed at a flowrate, pause the syringe pump again and reflow at the previously successful flowrate to see if the device recovers well. An ideal device will flow with no carryover.

Countercurrent Flow

To test countercurrent flow, switch the aqueous inlet and aqueous outlet tubing and repeat the steps above. Consider establishing a flow field at a rate as low as 2 µL/min, in some embodiments. In some examples, co-current flowrates can be four times greater than flowrates in a countercurrent flow configuration. Co-current flow and counter-current flow is illustrated in FIGS. 12 and 13.

Multi-layer Device Construction

Increasing the number of layers of screen channels can increase the cross-sectional area of the channel, which can dramatically increasing the achievable flowrates. In some embodiments, the device may benefit from having the flow field established and then equilibrated over a long period of time. To optimize the maximum achievable flowrate, a flow field can be established as described above, liquid can be flowed through the device over one or more flowrate iterations (e.g., three iterations) until carryover is observed. At this point, the liquid-liquid interface can be allowed to equilibrate (e.g., over a 12 to 24 hour period). When tested again, the flowrate may be improved.

In certain embodiments, the device need not be taken apart, cleaned, and reconstructed to maintain successful separation. Once a flow field is correctly established, successful flow has been observed for up to 2 weeks, depending on the fluids used in the system. Table 1 below includes the number of and type of the internal components to use, according to how many layers are desired in a device. In the example described in Table 1, the equations and numbers list stainless steel and PEEK components, in that order, with the assumption that stainless steel is the bottom layer of the device. If the device is built with PEEK as the bottom layer, then the order of values can be inverted. The equations in Table 1 are related to the thickness of each layer, and can be useful in achieving uniform thickness through the assembly.

TABLE 1

| # Layers | Thickness, μm | # ETFE | # Solid Caps, steel/PEEK | # Screen Caps, steel/PEEK | # Solid Sheets, steel/PEEK | # Screen Chan., steel/PEEK |
|---|---|---|---|---|---|---|
| 1 | 375 | 3 | 2/2 | 2/2 | 1/1 | 1/1 |
| 2 | 875 | 5 | 2/4 | 4/4 | 2/1 | 2/2 |
| 3 | 1250 | 7 | 4/4 | 6/6 | 2/2 | 3/3 |
| 4 | 1625 | 9 | 4/6 | 8/8 | 3/2 | 4/4 |
| ... | ... | ... | ... | ... | ... | ... |
| n | 375n + 125 | 2n + 1 | Stainless steel: $\begin{cases} n = \text{odd}, n+1 \\ n = \text{even}, n \end{cases}$ PEEK: $\begin{cases} n = \text{odd}, n+1 \\ n = \text{even}, n+2 \end{cases}$ | 2n | Stainless Steel: $\begin{cases} n = \text{odd}, \frac{n+1}{2} \\ n = \text{even}, \frac{n}{2}+1 \end{cases}$ PEEK: $\begin{cases} n = \text{odd}, \frac{n+1}{2} \\ n = \text{even}, \frac{n}{2} \end{cases}$ | n |

EXAMPLE 2

In a second example, microfluidic devices as described above with the number of liquid guide assemblies ("layers") given in Table 2 below were tested with water as a first liquid and various second liquids including xylenes, mixtures of xylenes and A336, and a toluene and acetone solution. The liquids, the number of layers, and the flow rates achieved in co-current and dual-flow (e.g., counter-current flow) arrangements are presented below in Table 2.

TABLE 2

| Liquids | # Layers | Co-current flow rate (μL/min) | Dual-flow flow rate (μL/min) |
|---|---|---|---|
| H$_2$O/Xylenes | 1 | 40 | 10 |
| H$_2$O/Xylenes | 2 | 95 | 17 |
| H$_2$O/Xylenes | 3 | 150 | 35 |
| H$_2$O/Xylenes + A336 1% | 1 | 10 | 3-5 |
| H$_2$O/Xylenes + A336 3% | 1 | 20 | |
| Water/Toluene + Acetone | 1 | 10 | |

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently.

Moreover, for the sake of simplicity, the attached figures may not show the various ways in which the disclosed methods can be used in conjunction with other methods.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

In view of the many possible embodiments to which the principles of the disclosed technology may be applied, it should be recognized that the illustrated embodiments are only examples and should not be taken as limiting the scope of the disclosure. Rather, the scope of the disclosure is at least as broad as the following claims.

The invention claimed is:

1. An assembly, comprising:
    a first liquid guide having an inlet, an outlet, and a liquid-conducting layer comprising a porous member, the porous member comprising a first material, the first liquid guide further comprising one or more solid members arranged with the porous member in a stacked arrangement, the liquid-conducting layer extending between the inlet and the outlet; and
    a second liquid guide having an inlet, an outlet, and a liquid-conducting layer comprising a second material that is different from the first material, the liquid-conducting layer extending between the inlet and the outlet;
    wherein at least a portion of the liquid-conducting layer of the second liquid guide overlaps the liquid-conducting layer of the first liquid guide such that, when a first liquid is present in the liquid-conducting layer of the first liquid guide and a second liquid is present in the liquid-conducting layer of the second liquid guide, the second liquid contacts the first liquid along the portion of the liquid-conducting layer of the second liquid guide that overlaps the liquid-conducting layer of the first liquid guide.

2. The assembly of claim 1, wherein the liquid-conducting layer of the first liquid guide comprises a mesh formed from a plurality of filaments.

3. The assembly of claim 1, wherein the first material comprises a hydrophilic material such that the liquid-conducting layer of the first liquid guide is configured to conduct an aqueous liquid.

4. The assembly of claim 3, wherein the second material comprises a hydrophobic material such that the liquid-conducting layer of the second liquid guide is configured to conduct an organic liquid.

5. The assembly of claim 4, wherein:
    the liquid-conducting layer of the first liquid guide comprises a metal screen; and
    the liquid-conducting layer of the second liquid guide comprises a polymeric screen.

6. The assembly of claim 1, wherein the liquid-conducting layer of the second liquid guide contacts the liquid-conducting layer of the first liquid guide along the portion of the liquid-conducting layer of the second liquid guide that overlaps the liquid-conducting layer of the first liquid guide.

7. The assembly of claim 1, wherein:
    the porous member is a first porous member; and
    the one or more solid members of the first liquid guide include a first solid member situated adjacent the porous member and having a size and shape corresponding to a size and shape of the porous member.

8. The assembly of claim 7, wherein:
    the first solid member forms a first layer of the first liquid guide;
    the first porous member is situated adjacent the first solid member and forms a second layer of the first liquid guide; and
    the first liquid guide further comprises a third layer comprising a plurality of second porous members, the second porous members being situated adjacent the first porous member such that the first porous member is located between the first solid member and the second porous members.

9. The assembly of claim 8, wherein the first liquid guide further comprises a fourth layer including a plurality of second solid members, the second solid members being situated adjacent the second porous members such that the first porous member and the second porous members are located between the first solid member and the second solid members.

10. The assembly of claim 9, wherein lengths of the second porous members and lengths of the second solid members are less than a length of the first porous member.

11. The assembly of claim 9, wherein:
    the first porous member comprises an inlet portion and an outlet portion;
    one of the second porous members is situated on the inlet portion of the first porous member; and
    one of the second porous members is situated on the outlet portion of the first porous member.

12. The assembly of claim 1, wherein the first and second liquid guides are situated in a housing.

13. The assembly of claim 12, wherein:
    the housing comprises one or more alignment pins; and
    the porous member and the one or more solid members comprise one or more openings configured to receive the alignment pins.

14. A method, comprising:
    situating a first liquid guide on a surface of a first housing portion, the first liquid guide having an inlet, an outlet, and a liquid-conducting layer comprising a porous member, the porous member comprising a first material, the first liquid guide further comprising one or more solid members arranged with the porous member in a stacked arrangement, the liquid-conducting layer extending between the inlet and the outlet;
    situating a second liquid guide on the surface of the first housing portion such that at least a portion of a liquid-conducting layer of the second liquid guide overlaps the liquid-conducting layer of the first liquid guide, and such that when a first liquid flows along the liquid-conducting layer of the first liquid guide and a second liquid flows along the liquid-conducting layer of the second liquid guide, the second liquid contacts the first liquid along the portion of the liquid-conducting layer of the second liquid guide that overlaps the liquid-conducting layer of the first liquid guide, the liquid-conducting layer of the second liquid guide comprising a second material that is different from the first material, the liquid-conducting layer of the second liquid guide extending between an inlet and an outlet of the second liquid guide; and
    securing a second housing portion to the first housing portion to enclose the first and second liquid guides.

15. The method of claim 14, wherein:
    situating the first liquid guide on the surface of the first housing portion further comprises stacking the porous member and the one or more solid members on the surface of the first housing portion.

16. The method of claim 15, wherein:
    the surface of the first housing portion further comprises one or more alignment pins; and
    situating the first liquid guide on the surface of the first housing portion further comprises stacking the porous member and the one or more solid members such that the one or more alignment pins are received in corresponding openings defined in the porous member and the one or more solid members.

17. The method of claim 14, further comprising situating a sealing member on the surface of the first housing portion.

18. A method, comprising:
   flowing a first liquid through the first liquid guide of the assembly of claim 1 such that the first liquid flows from the inlet of the first liquid guide, along the liquid-conducting layer of the first liquid guide, to the outlet of the first liquid guide; and
   flowing a second liquid through the second liquid guide such that the second liquid flows from the inlet of the second liquid guide, along the liquid-conducting layer of the second liquid guide, to the outlet of the second liquid guide;
   wherein the second liquid contacts the first liquid along the portion of the liquid-conducting layer of the second liquid guide that overlaps the liquid-conducting layer of the first liquid guide.

* * * * *